United States Patent
Zhang et al.

(10) Patent No.: US 11,809,726 B2
(45) Date of Patent: *Nov. 7, 2023

(54) DISTRIBUTED STORAGE METHOD AND DEVICE

(71) Applicant: Huawei Technologies Co., Ltd., Shenzhen (CN)

(72) Inventors: Yong Zhang, Hangzhou (CN); Yicong Cai, Shenzhen (CN); Ajith Raj Shetty S, Bangalore (IN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,030

(22) Filed: Mar. 7, 2022

(65) Prior Publication Data

US 2022/0188003 A1 Jun. 16, 2022

Related U.S. Application Data

(63) Continuation of application No. 15/851,212, filed on Dec. 21, 2017, now Pat. No. 11,301,154, which is a
(Continued)

(30) Foreign Application Priority Data

Feb. 6, 2016 (CN) .......................... 201610083819.8

(51) Int. Cl.
*G06F 3/06* (2006.01)
*G06F 11/14* (2006.01)
*G06F 16/182* (2019.01)

(52) U.S. Cl.
CPC ............ *G06F 3/0641* (2013.01); *G06F 3/061* (2013.01); *G06F 3/067* (2013.01); *G06F 3/0608* (2013.01);
(Continued)

(58) Field of Classification Search
CPC .... G06F 3/0641; G06F 3/0608; G06F 3/0647; G06F 3/067; G06F 11/1435
See application file for complete search history.

(56) References Cited

U.S. PATENT DOCUMENTS 8,234,372 B2   7/2012 Knapp et al.
8,495,296 B2 * 7/2013 Nagpal ............... G06F 16/1748
                                                 711/E12.091
(Continued)

FOREIGN PATENT DOCUMENTS

CN   102332029 A   1/2012
CN   102902716 A   1/2013
(Continued)

OTHER PUBLICATIONS

Zhang, D., "The Technical Research of Optimization of File Storage in HDFS," Nanjing Normal University, Feb. 2014, 64 pages. With partial English translation.

*Primary Examiner* — Huawen A Peng
(74) *Attorney, Agent, or Firm* — Conley Rose, P.C.

(57) ABSTRACT

A distributed storage method includes offline merging, by a first thread service of a distributed storage system, M small files in a file system; generating, by the first thread service, M pieces of metadata in the offline merging process; loading, by a second thread service of the distributed storage system, the M pieces of metadata into a metadata set; searching, by the second thread service, the metadata set for metadata of a first small file when the second thread service receives a first instruction; and performing, by the second thread service, the operation corresponding to the first instruction when the second thread service finds the metadata of the first small file in the metadata set.

20 Claims, 11 Drawing Sheets

Related U.S. Application Data continuation of application No. PCT/CN2016/095228, filed on Aug. 15, 2016.

(52) U.S. Cl.
CPC .......... *G06F 3/0643* (2013.01); *G06F 3/0647* (2013.01); *G06F 11/1435* (2013.01); *G06F 16/182* (2019.01)

(56) References Cited

U.S. PATENT DOCUMENTS

| | | | |
|---|---|---|---|
| 8,850,126 B2 | 9/2014 | Prabhu et al. | |
| 8,972,465 B1 | 3/2015 | Faibish et al. | |
| 9,201,890 B2 * | 12/2015 | Jayaraman | G06F 3/0641 |
| 9,223,500 B1 * | 12/2015 | Lemar | G06F 3/0608 |
| 9,430,164 B1 * | 8/2016 | Botelho | G06F 12/0862 |
| 10,037,332 B1 * | 7/2018 | Clark | H04L 51/08 |
| 10,146,782 B1 * | 12/2018 | Bono | G06F 16/11 |
| 10,585,733 B1 | 3/2020 | Colgrove et al. | |
| 10,764,789 B2 | 9/2020 | Qiao et al. | |
| 2004/0006555 A1 | 1/2004 | Yamamoto et al. | |
| 2006/0153074 A1 | 7/2006 | Hurtta et al. | |
| 2009/0271412 A1 | 10/2009 | Lacapra et al. | |
| 2012/0016864 A1 | 1/2012 | Goyal et al. | |
| 2013/0024428 A1 | 1/2013 | Patwardhan | |
| 2014/0047207 A1 * | 2/2014 | Baldwin | G06F 16/1724 711/E12.002 |
| 2015/0277802 A1 * | 10/2015 | Oikarinen | G06F 3/0689 711/114 |
| 2017/0177447 A1 * | 6/2017 | Golander | G06F 11/1471 |

FOREIGN PATENT DOCUMENTS

| | | |
|---|---|---|
| CN | 103020135 A | 4/2013 |
| CN | 103500089 A | 1/2014 |
| CN | 103577123 A | 2/2014 |
| CN | 104133882 A | 11/2014 |
| CN | 104778229 A | 7/2015 |

* cited by examiner

DISTRIBUTED STORAGE METHOD AND DEVICE

CROSS-REFERENCE TO RELATED APPLICATIONS

This is a continuation of U.S. patent application Ser. No. 15/851,212 filed on Dec. 21, 2017, which is a continuation of International Patent Application No. PCT/CN2016/095228 filed on Aug. 15, 2016, which claims priority to Chinese Patent Application No. 201610083819.8 filed on Feb. 6, 2016. All of the aforementioned patent applications are hereby incorporated by reference in their entireties.

TECHNICAL FIELD

The present disclosure relates to a computer field, and in particular, to a distributed storage method and device in computer technologies.

BACKGROUND

A distributed file system named Hadoop (Hadoop Distributed File System, "HDFS" for short) is a distributed file system for storing a file in a block form. A NameNode is used to store metadata of a file. The metadata includes a directory tree structure and block information stored in the file. A DataNode is used to store a data block.

SUMMARY

Embodiments of the present disclosure provide a distributed storage method, to resolve a problem that when small files are being stored in a file system, memory overheads of a NameNode are large and computing performance of MapReduce is relatively low.

According to a first aspect, an embodiment of the present disclosure provides a distributed storage method, where the method is applied to a distributed storage system, and the system includes a file system, a first thread service, and a second thread service; and the method includes: offline merging, by the first thread service, M small files in the file system into one first file according to a first rule, where sizes of the small files are less than predefined bytes, and M is an integer greater than 1; generating, by the first thread service, M pieces of metadata in the offline merging process, where the M pieces of metadata are used to respectively indicate locations of the M small files in the first file; loading, by the second thread service, the M pieces of metadata into a metadata set, where the metadata set includes metadata generated in any offline merging process; searching, by the second thread service, the metadata set for metadata of a first small file when the second thread service receives a first instruction sent by a user, where the first instruction is used to instruct to perform an operation on the first small file; and performing, by the second thread service, the operation corresponding to the first instruction if the second thread service finds the metadata of the first small file in the metadata set.

Therefore, according to the distributed storage method in this embodiment of the present disclosure, when small files are being stored in a file system by using a first thread service and a second thread service, memory overheads of a NameNode and handle overheads of a DataNode can be significantly reduced, and computing efficiency of MapReduce can be improved, so that efficiency of storing small files can be improved.

Optionally, when the first instruction is used to instruct to read the first small file, the method further includes: returning, by the second thread service, a message that the first small file does not exist to the user if the second thread service does not find the metadata of the first small file in the metadata set.

Therefore, according to the distributed storage method in this embodiment of the present disclosure, after a second thread service receives an instruction for reading a first small file, when metadata of the first small file is not found in a metadata set, the second thread service returns a message that the first small file does not exist to a user, making it convenient for the user and improving user experience.

Optionally, when the first instruction is used to instruct to read the first small file, the performing, by the second thread service, the operation corresponding to the first instruction includes: reading, by the second thread service, the metadata of the first small file.

Therefore, according to the distributed storage method in this embodiment of the present disclosure, a second thread service reads small files by reading metadata of a first file in a metadata set, so that a rate of reading small files in a file system can be improved.

Optionally, when the first instruction is used to instruct to create the first small file, the method further includes: creating, by the second thread service, the first small file in the file system if the metadata set does not include the metadata of the first small file.

Therefore, according to the distributed storage method in this embodiment of the present disclosure, after a second thread service receives an instruction for creating a first small file, when metadata of the first small file is not found in a metadata set, the second thread service creates the first small file, so that unnecessary system memory overheads can be reduced, and efficiency of storing small files can be improved.

Optionally, when the first instruction is used to instruct to create the first small file, the performing, by the second thread service, the operation corresponding to the first instruction includes: sending the user a prompt message "whether to overwrite first small file content"; and returning, by the second thread service, a creation failure message to the user if the user does not enter "whether to overwrite the first small file content".

Therefore, according to the distributed storage method in this embodiment of the present disclosure, after a second thread service finds metadata of a first small file in a metadata set, when a user does not enter "whether to overwrite first small file content", the second thread service returns a creation failure message to the user, making it convenient for the user, reducing unnecessary system memory overheads, and improving efficiency of storing small files.

Optionally, when the first instruction is used to instruct to create the first small file, the performing, by the second thread service, the operation corresponding to the first instruction further includes: sending the user a prompt message "whether to overwrite first small file content"; and deleting, by the second thread service, the metadata of the first small file in the metadata set, and recreating metadata of the first small file in the metadata set, if the user enters "overwriting the first small file content".

Therefore, according to the distributed storage method in this embodiment of the present disclosure, after a second thread service finds metadata of a first small file in a metadata set, when a user enters "overwriting first small file content", the second thread service recreates the metadata of the first small file in the metadata set, so that system memory overheads can be reduced, and efficiency of storing small files can be improved.

Optionally, when the first instruction is used to instruct to create the first small file, the performing, by the second thread service, the operation corresponding to the first instruction further includes: sending the user a prompt message "whether to overwrite first small file content"; and replacing, by the second thread service, the metadata of the first small file in the metadata set if the user enters "overwriting the first small file content".

Therefore, according to the distributed storage method in this embodiment of the present disclosure, after a second thread service finds metadata of a first small file in a metadata set, when a user enters "overwriting first small file content", the second thread service replaces the metadata of the first small file in the metadata set, so that system memory overheads can be reduced, and efficiency of storing small files can be improved.

Optionally, when the first instruction is used to instruct to delete the first small file, the method further includes: deleting, by the second thread service, the first small file from the file system when the metadata set does not include the metadata of the first small file.

Therefore, according to the distributed storage method in this embodiment of the present disclosure, after a second thread service receives an instruction for deleting a first small file, when metadata of the first small file is not found in a metadata set, the second thread service deletes the first small file, so that redundant data in a file system can be reduced, and efficiency of storing small files can be improved.

Optionally, when the first instruction is used to instruct to delete the first small file, the performing, by the second thread service, the operation corresponding to the first instruction includes: deleting, by the second thread service, the metadata of the first small file from the metadata set when the user has permission to delete the first file.

Therefore, according to the distributed storage method in this embodiment of the present disclosure, when a user has permission to delete a first file, a second thread service deletes metadata of a first small file in a metadata set, so that given user management permission can be provided, user experience can be enhanced, and efficiency of storing small files can be improved.

Optionally, after the second thread service deletes the metadata of the first small file in the metadata set, the second thread service loads Editlog and deletelog that are generated in the delete process into the file system, the deletelog includes deletion information, and the deletion information is used to instruct to delete the first small file in the first file.

Therefore, according to the distributed storage method in this embodiment of the present disclosure, a second thread service deletes Editlog and deletelog that are generated in a delete process into a file system, making it convenient to subsequently perform an operation of deleting a small file in a first file.

Optionally, the offline merging M small files in the file system into one first file according to a first rule includes: traversing, by the first thread service, a small-file directory in the file system; grouping, by the first thread service, all small files in the file system according to a second rule; starting, by the first thread service, a MapReduce MR task, and offline merging at least M small files in each group into one first file according to the first rule; generating, by the first thread service, M pieces of metadata in the offline merging process, where the M pieces of metadata are used to respectively indicate locations of the M small files in the first file; and starting, by the first thread service, a checkpoint operation, and loading, by the second thread service, the M pieces of metadata generated in the offline merging process into the metadata set.

Therefore, according to the distributed storage method in this embodiment of the present disclosure, M small files in a file system can be offline merged into a first file by using a first thread service and a second thread service. Memory overheads of a NameNode and handle overheads of a DataNode can be significantly reduced, and computing efficiency of MapReduce can be improved, so that efficiency of storing small files can be improved.

Optionally, the system further includes a third thread service, and the third thread service reads the deletelog and performs matching between the deletelog and the M pieces of metadata of the small files in the metadata set; and if the deletelog instructs to delete N small files from the first file, the third thread service deletes the N small files, where N is a positive integer less than M; or if the deletelog instructs to delete the M small files from the first file, the third thread service deletes the first file.

Therefore, according to the distributed storage method in this embodiment of the present disclosure, invalid small files in a first file can be deleted or a first file can be deleted by using a third thread service, and redundant data in a file system is cleared, so that efficiency of storing small files is improved.

Optionally, the system further includes a fourth thread service, and the fourth thread service traverses the small-file directory in the file system and performs matching between the directory and the metadata in the metadata set; if no small file in the directory is indexed to the first file, the fourth thread service deletes the first file; or if a name of a small file in the directory and a name of a small file in the metadata set are repeated, the second thread service is invoked to delete metadata of the small file in the metadata set; and the fourth thread service clears Editlog and deletelog that are generated in the delete process.

Therefore, according to the distributed storage method in this embodiment of the present disclosure, redundant data in a system can be cleared by using a fourth thread service, so that efficiency of storing small files is improved.

Optionally, the first thread service is a thread service for offline merging small files, and the second thread service is a thread service for a namespace.

Optionally, the third thread service is a thread service for offline deleting the small files in the first file.

Optionally, the fourth thread service is a thread service for clearing redundancy.

Optionally, the second rule is: grouping is performed according to user file permission and user group file permission.

Therefore, according to the distributed storage method according to this embodiment of the present disclosure, a first thread service groups all small files in a file system according to user file permission and user group file permission and according to a second rule, so that user permission management can be enhanced, user experience can be enhanced, and system storage efficiency can be improved.

According to a second aspect, a distributed storage device is provided, including a memory, a processor, and a bus, the memory and the processor are connected and communicate by using the bus, the memory stores a program and an instruction, and the processor invokes the program and the instruction in the memory, to perform the method in any one of the first aspect or the possible implementation manners of the first aspect.

Therefore, according to the distributed storage method and device in the embodiments of the present disclosure, when small files are being stored in a file system by using a first thread service and a second thread service, memory overheads of a NameNode and handle overheads of a DataNode can be significantly reduced, and computing efficiency of MapReduce can be improved, so that efficiency of storing small files in the file system can be improved.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

A small file refers to a file whose file size is less than a block size. Hadoop Distributed File System (HDFS) is designed based on a Google file system (Google File System, "GFS" for short) of Google, and is used to store a large file. In the HDFS, a default value of a block size is 128 MB, a default value of a block size in an old version is 64 MB, and the block size tends to be increasingly larger. However, the HDFS cannot work well when there are a large quantity of small files.

In the HDFS, major problems of small-file storage are a memory management problem of the NameNode and a performance problem of MapReduce (MR).

On one hand, the memory management problem of the NameNode is specifically as follows: It is learned from experience that a memory size occupied by each file, each directory, and each block object in the HDFS NameNode is 150 bytes. If there are ten million files, and each file uses one block, that is, each file size is less than one block size, the NameNode uses an about 3-GB memory. If a system scale is enlarged, a much larger memory than the 3-GB memory is required. Therefore, hardware support and software optimization are required, and this brings problems.

In addition, the HDFS is not designed for a small file. Therefore, the HDFS cannot effectively support small-file access. The HDFS is mainly used for accessing input/output streaming large files. Reading a small file generally requires a large quantity of searching and retrieving from one DataNode to another DataNode. This is an inefficient data access mode.

On the other hand, the performance problem of the MR is specifically as follows:

An MR task is first performing mapping and then performing reducing. A mapping task quantity is obtained in consideration of both a file quantity and a block quantity. If each file size is less than a block size, each file has a mapping task. In this way, a file size read by each task is extremely small. Therefore, a start-stop time of a task is much greater than a computation execution time of the task, and performance is deteriorated.

If small files are merged into a large file, and each mapping task processes one or more large files, each task can process many small files.

Therefore, in consideration of both the foregoing two aspects, when a large quantity of small files are being stored in the HDFS, memory overheads of a NameNode are excessively large, and computing performance of MapReduce is relatively low.

Figure 1:
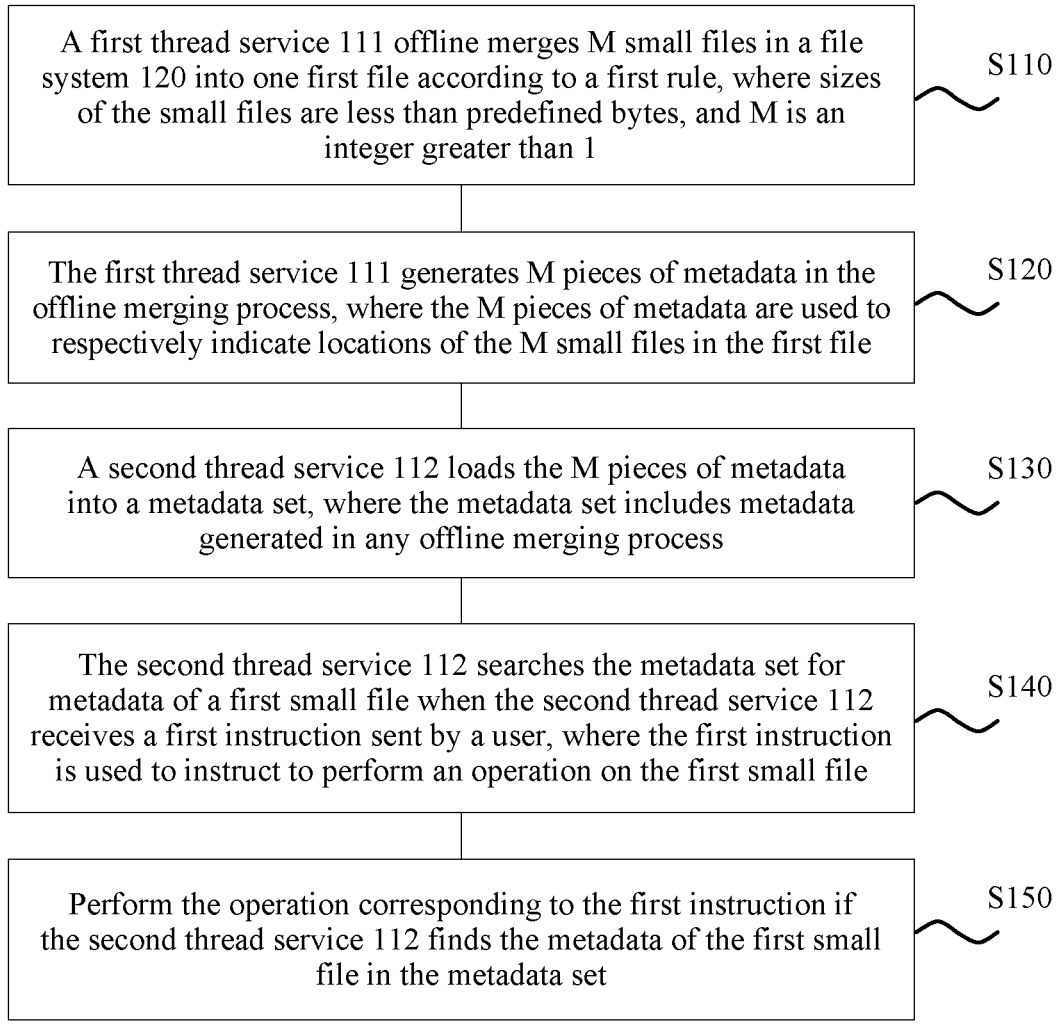
FIG. 1 is a schematic flowchart of a distributed storage method according to an aspect of the present disclosure.

FIG. 1 is a schematic flowchart of a distributed storage method according to an aspect of the present disclosure. The method includes S110 to S150. As shown in FIG. 1, the method is applied to a distributed storage system 100. The system 100 includes a file system 120, a first thread service 111, and a second thread service 112.

S110. The first thread service 111 offline merges M small files in the file system 120 into one first file according to a first rule, where sizes of the small files are less than predefined bytes, and M is an integer greater than 1.

S120. The first thread service 111 generates M pieces of metadata in the offline merging process, where the M pieces of metadata are used to respectively indicate locations of the M small files in the first file.

S130. The second thread service 112 loads the M pieces of metadata into a metadata set, where the metadata set includes metadata generated in any offline merging process.

S140. The second thread service 112 searches the metadata set for metadata of a first small file when the second thread service 112 receives a first instruction sent by a user, where the first instruction is used to instruct to perform an operation on the first small file.

S150. The second thread service 112 performs the operation corresponding to the first instruction if the second thread service 112 finds the metadata of the first small file in the metadata set.

Therefore, according to the distributed storage method in this aspect of the present disclosure, when small files are being stored in a file system 120 by using a first thread service 111 and a second thread service 112, memory overheads of a NameNode and handle overheads of a DataNode can be significantly reduced, and computing efficiency of MapReduce can be improved, so that efficiency of storing small files in the file system can be improved.

It should be understood that the small file may be a file whose file size is less than a block size. The first file may a file whose file size is greater than or equal to a block size. The block size may be a current default block size, that is, 128 MB, or may be an old-version block size, that is, 64 MB. The block size is not limited in this aspect of the present disclosure. For ease of understanding, the first file may be referred to as a "large file" in subsequent aspects of the present disclosure.

It should be understood that the distributed storage system 100 includes the file system 110, the first thread service 111, and the second thread service 112. The file system 110 may be an HDFS 120, the first thread service 111 may be a thread service 111 for offline merging small files, and the second thread service 112 may be a thread service 112 for a namespace. In the subsequent aspects of the present disclosure, the first thread service 111 is described by using "the thread service 111 for offline merging small files" as an example, the second thread service is described by using "the thread service 112 for a namespace" as an example, and the file system is described by using "the HDFS 120" as an example. However, this is not limited in this aspect of the present disclosure.

It should be further understood that a background service main process 110 for small files may include the thread service 111 for offline merging small files, the thread service 112 for a namespace. For example, the background service main process for small files is an FGCService 110. The FGCService 110 may be used for responsible for scheduling a task of offline merging small files and managing metadata of small files.

Figure 2:
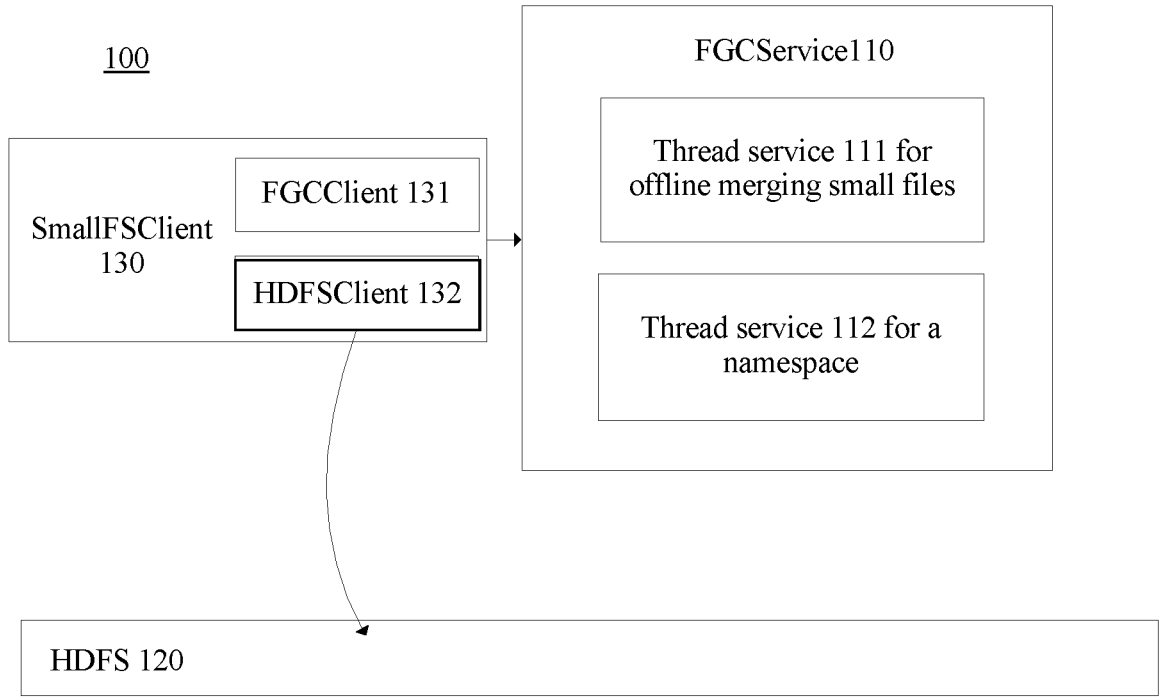
FIG. 2 is a schematic architecture diagram of a distributed storage system according to an aspect of the present disclosure.

It should be further understood that, as shown in FIG. 2, FIG. 2 is a schematic architecture diagram of a distributed storage system according to an aspect of the present disclosure. The system 100 may further include a small-file access interface 130 such as a SmallFSClient 130. The SmallFSClient 130 is configured to provide an access interface for the FGCService 110 such as an FGCClient 111, and provide an access interface for the HDFS 120 such as an HDFSClient 112.

Specifically, the SmallFSClient 130 may be configured to implement a small-file access interface. An FGCClient 131 may access the FGCService 110 by using a remote procedure call protocol (Remote Procedure Call Protocol, "RPC" for short), and then access a small-file index by using the thread service 112 for a namespace. An HDFSClient 132 may access the HDFS 120 by using the RPC to access a small file or a large file.

It should be understood that, the FGCService 110, the HDFS 120, and the SmallFSClient 130 in the distributed storage system may be on a same physical device, or may be on different physical devices, or any two parts in the distributed storage system are on a same physical device.

Optionally, the distributed storage system 100 may further include a metadata set.

It should be understood that the FGCService 110 may access the metadata set. The metadata set may be any metadata set, of small files, that is stored in a form of key (Key) and value (Value). This is not limited in the present disclosure. For example, the metadata set may be a LevelDB or may be a metadata database. The metadata set is described by using the LevelDB as an example in subsequent aspects of the present disclosure.

In this aspect of the present disclosure, to facilitate management of metadata of small files and improve access performance of interfaces, one LevelDB may be created for each small-file directory in the HDFS 120 to store metadata of the small files. The LevelDB may be shown in FIG. 3.

Figure 3:
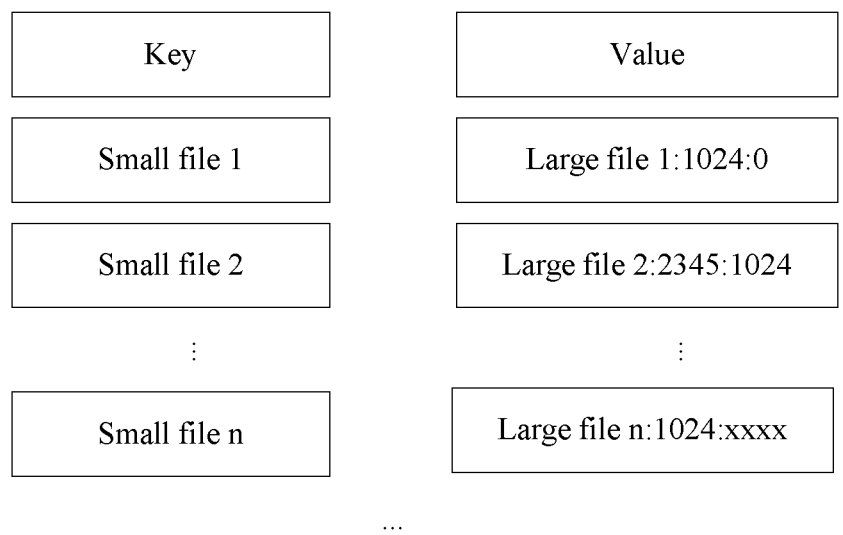
FIG. 3 is a schematic structural diagram of a LevelDB according to an aspect of the present disclosure.

Specifically, as shown in FIG. 3, a metadata structure of the LevelDB includes key and value. The key is used to indicate a file name of a small file, such as a small file 1, a small file 2, and a small file n. The value includes a large-file name, a small-file size, and an offset of a small file in a large file. For example, large file 1:1024:0 in the value indicates that a large-file name is 1, a size of a small file in the large file is 1024 KB, and an offset of the small file in the large file is 0. For example, large file 2:2345:1024 or large file n:1024:xxxx is similar.

Therefore, small files can be offline merged into a large file by using an FGCService 110. Metadata of small files in an HDFS 120 is stored in a form of key and value, and a data volume of a file and a block in the HDFS 120 can be reduced, so that memory overheads of a NameNode and handle overheads of a DataNode are reduced, and scalability of a distributed storage system is improved.

Optionally, the distributed storage system 100 may further include one active FGCService and at least one standby FGCService.

It should be understood that the standby FGCService may include the thread service 111 for offline merging small files and the thread service 112 for a namespace. Specifically, the standby FGCService may be used as an alternate FGCService. For example, when a failure occurs on the active FGCService, the distributed storage system 100 may replace the active FGCService with the standby FGCService.

Figure 4:
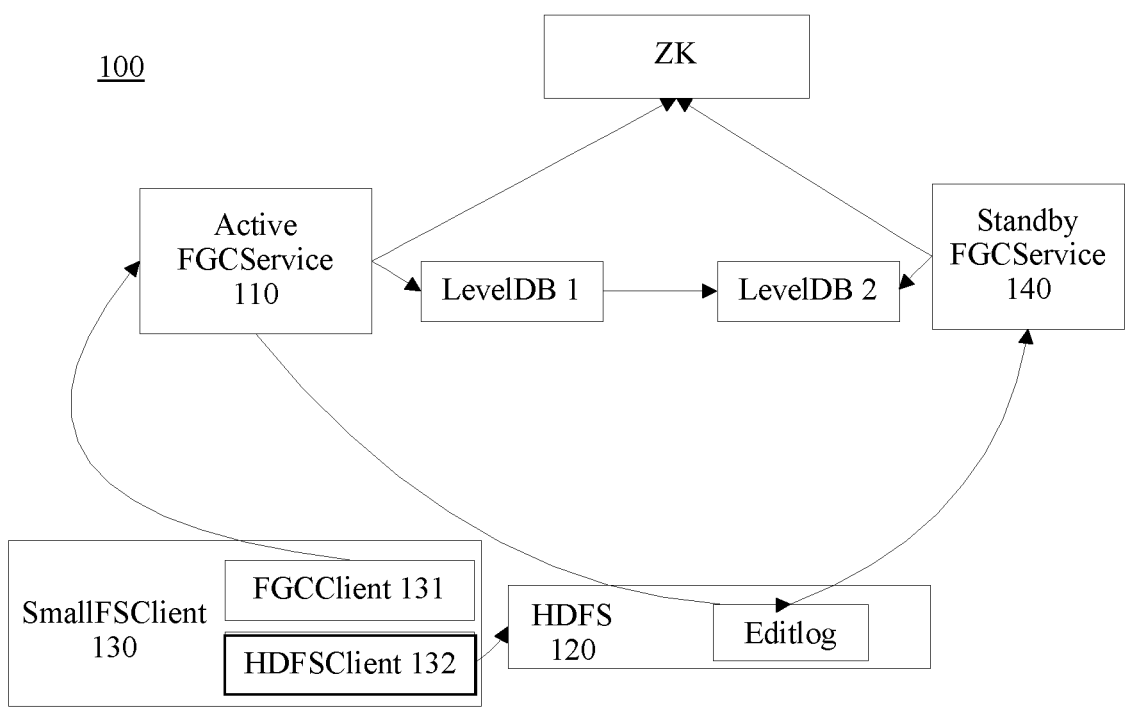
FIG. 4 is a flowchart of high availability (High Availability, "HA" for short) of a distributed storage system according to an aspect of the present disclosure.

As shown in FIG. 4, FIG. 4 is a flowchart of HA of a distributed storage system according to an aspect of the present disclosure. When the distributed storage system 100 includes two FGCServices, the two FGCServices are registered with a distributed application program coordination service (Zookeeper, "ZK" for short) after staring, and attempt to become an active FGCService. An FGCService that can successfully establish a time-domain (Session) directory is an active (Active) FGCService 110, and the other FGCService is a standby (Standby) FGCService 140.

It should be understood that the active FGCService 110 may access a LevelDB 1. The standby FGCService 140 may access a LevelDB 2. Both the LevelDB 1 and the LevelDB 2 may be used to store metadata of small files in the HDFS 120. Metadata synchronization between the LevelDB 1 and the LevelDB 2 may be performed by using Editlog. The Editlog may be stored in the HDFS 120 to ensure reliability.

It should be further understood that there may be one or more ZKs. The ZK may store status information. Specifically, the ZK may store information which FGCService is the active FGCService 110 and which FGCService is the standby FGCService 140 in FGCServices.

Specifically, the FGCClient 111 may access the active FGCService by using the RPC. The HDFSClient 112 may access the HDFS 120 by using the RPC.

It should be understood that the ZK may include one ZK or may be a ZK cluster. The ZK cluster may include at least one ZK.

It should be understood that the active FGCService 110 may generate Editlog stored in the HDFS 120. The standby FGCService 140 may regularly obtain the Editlog, perform a Checkpoint operation, and invoke the thread service 112 for a namespace to load the Editlog into the LevelDB 2 of the standby FGCService 140.

Therefore, in the distributed storage method according to this aspect of the present disclosure, when small files are being stored in an HDFS 120 by using an active FGCService 110 and a standby FGCService 140, system reliability can be improved, and computing efficiency of MapReduce can be improved, so that efficiency of storing the small files in the HDFS can be improved.

Optionally, the FGCService 110 may further include a third thread service 113. The third thread service may be a thread service 113 for offline deleting small files from a large file. The thread service 113 for offline deleting small files from a large file may be used to delete small files from a large file.

Optionally, the FGCService 110 may further include a fourth thread service 114. The fourth thread service may be a thread service 114 for clearing redundancy. The thread service 114 for clearing redundancy may be used to clear redundant data in the HDFS 120 or in the FGCService 110.

Therefore, it should be understood that an FGCService 110 may be used to invoke tasks of offline merging, and deleting and clearing redundant data, manage metadata of small files, provide an interface for accessing metadata by using a remote procedure call protocol RPC, and support ZK-based HA deployment.

Figure 5:
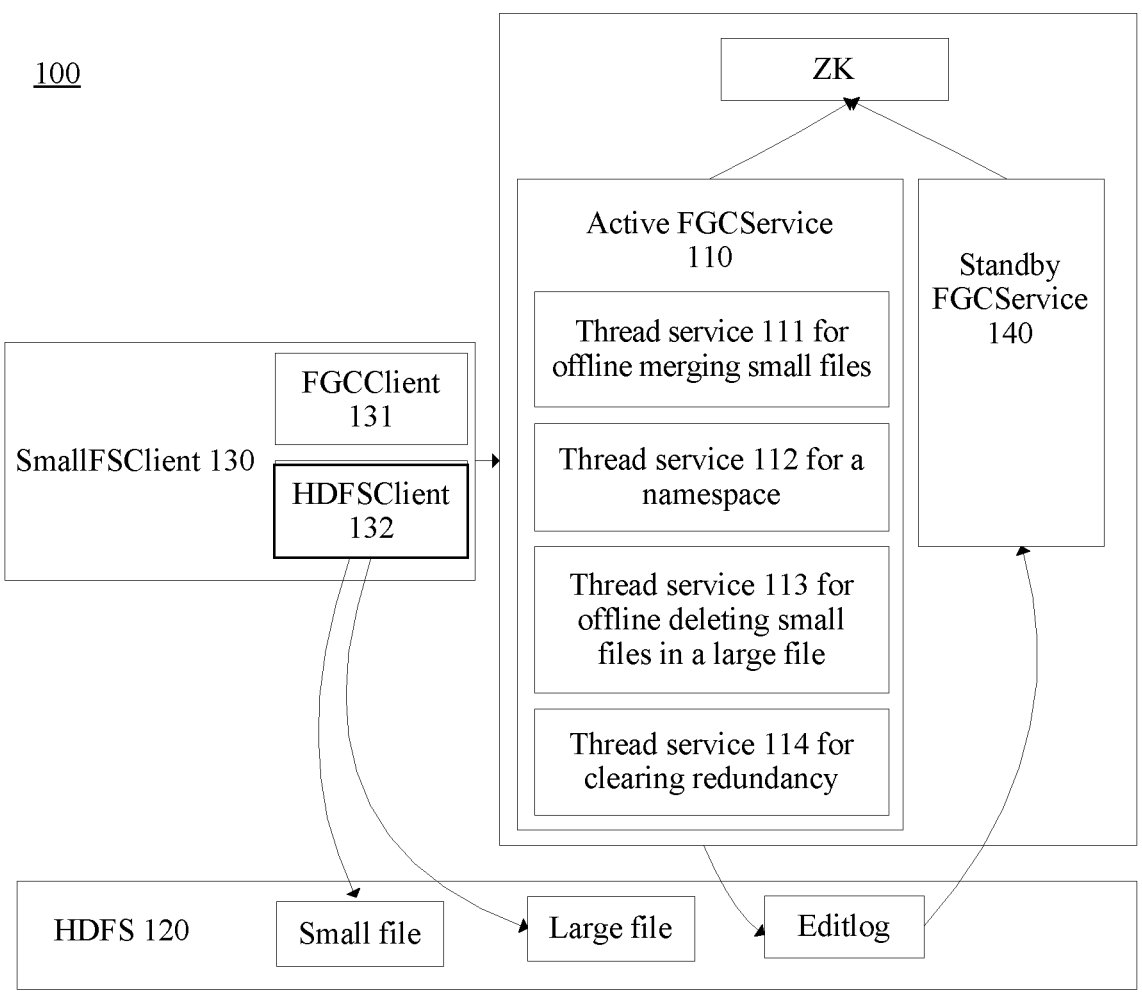
FIG. 5 is another architecture diagram of a distributed storage system according to an aspect of the present disclosure.

Optionally, as shown in FIG. 5, FIG. 5 is an architecture diagram of a distributed storage system according to an aspect of the present disclosure. The distributed storage system 100 may further include: the thread service 113 for offline deleting small files in a large file, the thread service 114 for clearing redundancy, and the standby FGCService 140.

It should be further understood that when no failure occurs on the active FGCService 110, the system generally does not start the standby FGCService 140. Therefore, an FGCService is described by using the active FGCService 110 as an example in subsequent aspects of the present disclosure. The active FGCService 110 is referred to as "FGCService 110". The LevelDB 1 accessed by the active FGCService 110 is referred to as "LevelDB".

Figure 6:
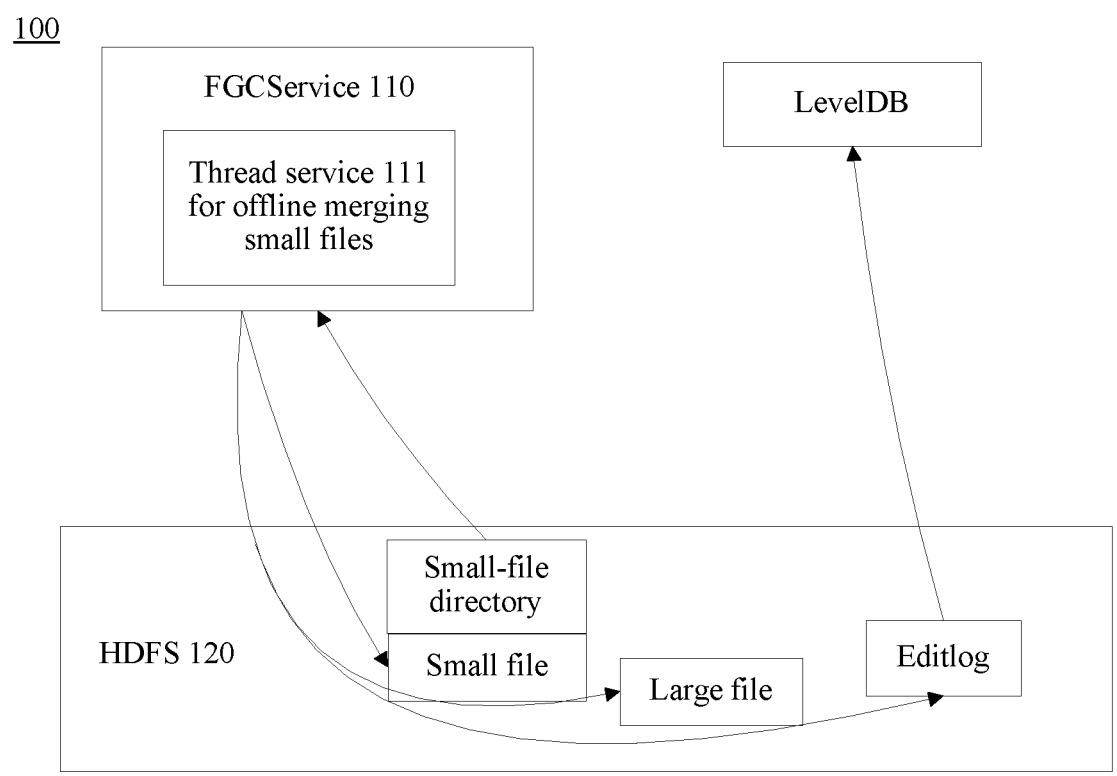
FIG. 6 is a schematic flowchart of offline merging small files in a distributed storage method according to an aspect of the present disclosure.

Specifically, as shown in FIG. 6, a user can access the SmallFSClient 130 according to a requirement. The user can implement, by accessing the FGCClient 131, related operations such as reading a small file, creating a small file, and deleting a small file and a directory. In addition, the FGCService 110 may regularly and automatically start a task such as merging small files, or deleting small files in a large file, or clearing redundant data.

Therefore, in the distributed storage method according to this aspect of the present disclosure, when small files are being stored in an HDFS 120 by using the distributed storage system, computing efficiency of MapReduce can be improved, a small file or a small-file directory can be deleted, and a user permission management function can be further provided, so that efficiency of storing the small files in the HDFS 120 can be improved.

The distributed storage method in this aspect of the present disclosure is described in the foregoing content. The following specifically describes specific implementation manners of functions of each part in the distributed storage method.

It should be understood that the FGCService 110 includes the thread service 111 for offline merging small files, such as a MergeService 111. The thread service 111 for offline merging small files may be started regularly. As shown in FIG. 6, FIG. 6 is a schematic flowchart of a method for offline merging small files according to a distributed storage method of the present disclosure. When the FGCService 110 regularly starts the thread service 111 for offline merging small files, the following operations may be performed in the distributed storage system 100.

The thread service 111 for offline merging small files traverses a small-file directory in the HDFS 120, and groups small files.

Specifically, the thread service 111 for offline merging small files may group the small files in the file system according to a second rule. For example, first the small files are grouped according to users, and then small files in each group are grouped according to a sum of file sizes. It should be understood that the thread service 111 for offline merging small files may further group the small files according to another condition. This is not limited in the present disclosure.

The thread service 111 for offline merging small files starts an MR task to merge small files in each group into a large file according to a first rule, and starts a checkpoint operation to invoke the thread service 112 for a namespace to load Editlog generated in the merge process into the LevelDB.

Specifically, the MR task or the checkpoint operation may be started regularly. The first rule may be as follows: Small files that are in a same directory, whose sizes are less than a specific configuration threshold, and that are generated a given time ago are grouped according to a user and a user group with file permission. Small files are merged when a group size reaches a large-file size. A merge rule for offline merging small files into a large file in the file system is not limited in the present disclosure.

It should be understood that the configuration threshold may be a preset threshold or may be a threshold set randomly. The given time ago may refer to a day ago or 12 hours ago. This is not limited in the present disclosure.

Optionally, after the thread service 111 for offline merging small files starts the checkpoint operation, the thread service 111 for offline merging small files deletes the merged small files from the HDFS 120.

Therefore, in this aspect of the present disclosure, a thread service 111 for offline merging small files and a thread service 112 for a namespace can offline merge small files in an HDFS 120 into a large file and can delete merged small files, so that efficiency of storing the small files in the HDFS 120 can be improved.

Figure 7:
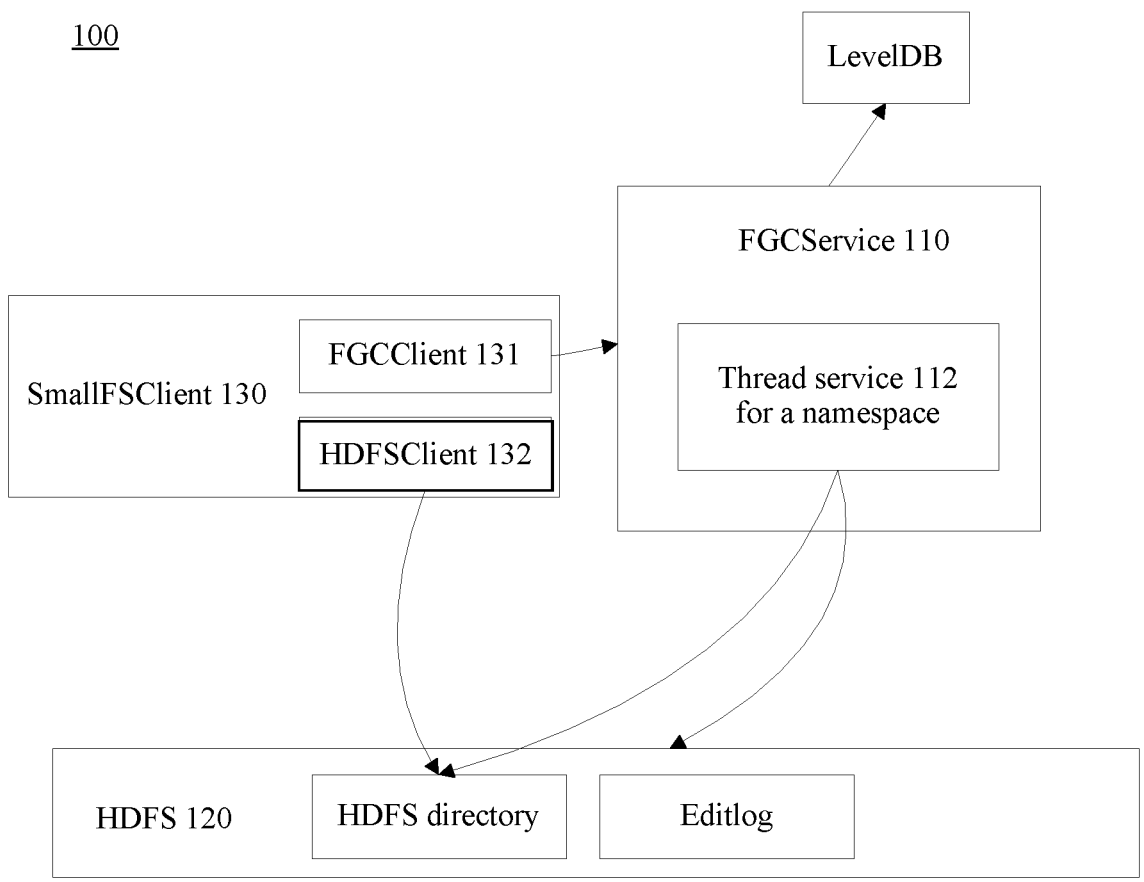
FIG. 7 is a schematic flowchart of a directory operation in a distributed storage method according to an aspect of the present disclosure.

Optionally, as shown in FIG. 7, FIG. 7 is a schematic flowchart of a directory operation in a distributed storage method according to an aspect of the present disclosure. In the distributed storage system 100, the FGCService 110 includes the thread service 112 for a namespace. When a user sends, by using the FGCClient 131, a request for deleting an HDFS directory, the thread service 112 for a namespace may delete the HDFS directory and the LevelDB, and loads Editlog generated in the delete process into the HDFS 120.

Optionally, as shown in FIG. 7, in the distributed storage system 100, when the user sends, by using the HDFSClient 132, a request for reading or writing or modifying an HDFS directory, the HDFSClient 132 may access the HDFS 120, and reads or writes or modifies the HDFS directory in the HDFS 120.

It should be understood that content in the HDFS directory may be corresponding to content in the LevelDB. Metadata of small files in the HDFS directory may be corresponding to metadata of small files in the LevelDB. However, a storage form of the metadata of the small files in the HDFS directory may be different from a storage form of the metadata of the small files in the LevelDB.

Therefore, in this aspect of the present disclosure, a user can implement related operations for a small-file directory by using a thread service 112 for a namespace and an HDFS 120, so that efficiency of storing small files in the HDFS 120 can be improved.

Figure 8:
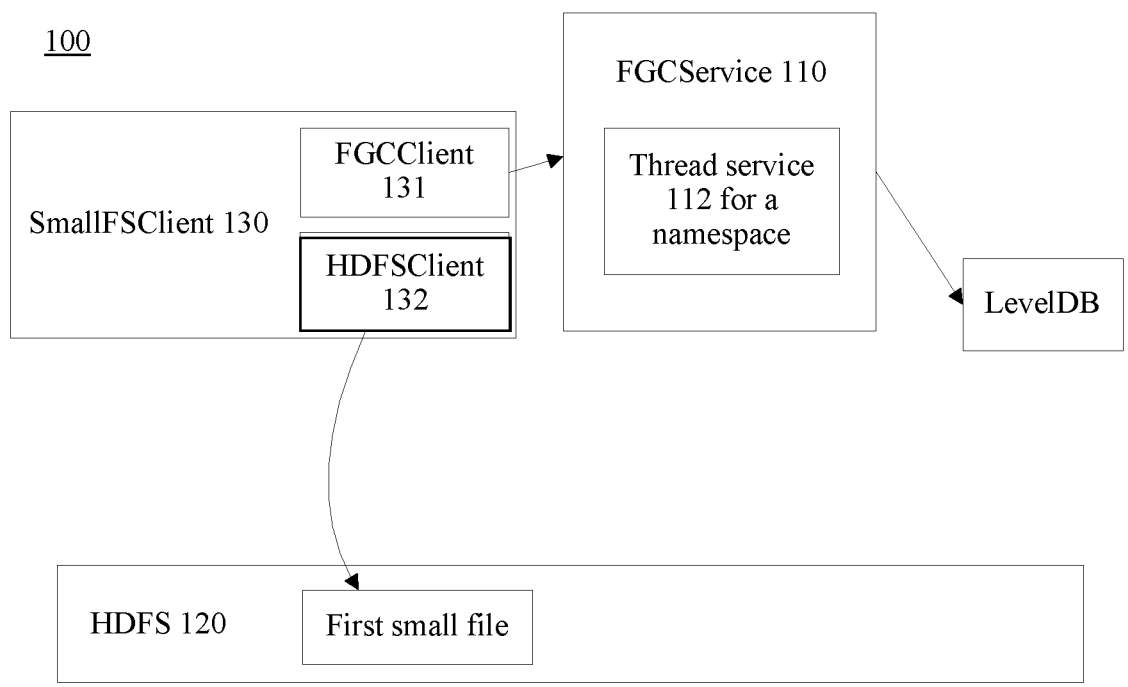
FIG. 8 is a schematic flowchart of reading a first small file in a distributed storage method according to an aspect of the present disclosure.

Optionally, as shown in FIG. 8, FIG. 8 is a schematic flowchart of reading a small file in a distributed storage method according to an aspect of the present disclosure. In the distributed storage system 100, when a user sends, by using the HDFSClient 132, a request for reading a first small file, and when the HDFS 120 includes the first small file, the user may read the first small file by using the HDFSClient 132. When the HDFS 120 does not include the first small file, the FGCClient 131 may access the thread service 112 for a namespace.

Specifically, when the LevelDB does not include metadata of the first small file, the thread service 112 for a namespace returns a message that the first small file does not exist to the user.

When the LevelDB includes metadata of the first small file, the thread service 112 for a namespace reads the metadata of the first small file, and accesses a merged large file corresponding to the first small file in the HDFS 120 by using the metadata of the first small file.

Therefore, in this aspect of the present disclosure, a user can read a small file in an HDFS 120 by using a thread service 112 for a namespace, so that efficiency of reading small files in the HDFS 120 can be improved.

Optionally, in the distributed storage system 100, when the user sends, by using the FGCClient 131, a request for creating a first small file, the thread service 112 for a namespace may determine whether metadata of the first small file exists in the LevelDB.

Specifically, when the LevelDB includes the metadata of the first small file, and the user enters "overwriting first small file content", the thread service 112 for a namespace may delete the metadata of the first small file from the LevelDB, and recreate metadata of the first small file in the LevelDB.

When the LevelDB includes the metadata of the first small file, and the user does not enter "whether to overwrite first small file content", the thread service 112 for a namespace may return a creation failure message to the user.

When the LevelDB does not include the metadata of the first small file, the HDFSClient 132 may invoke the HDFS 120 to create the first small file.

Therefore, in this aspect of the present disclosure, a user can create a small file by using a thread service 112 for a namespace, so that efficiency of storing small files in an HDFS 120 can be improved.

Figure 9:
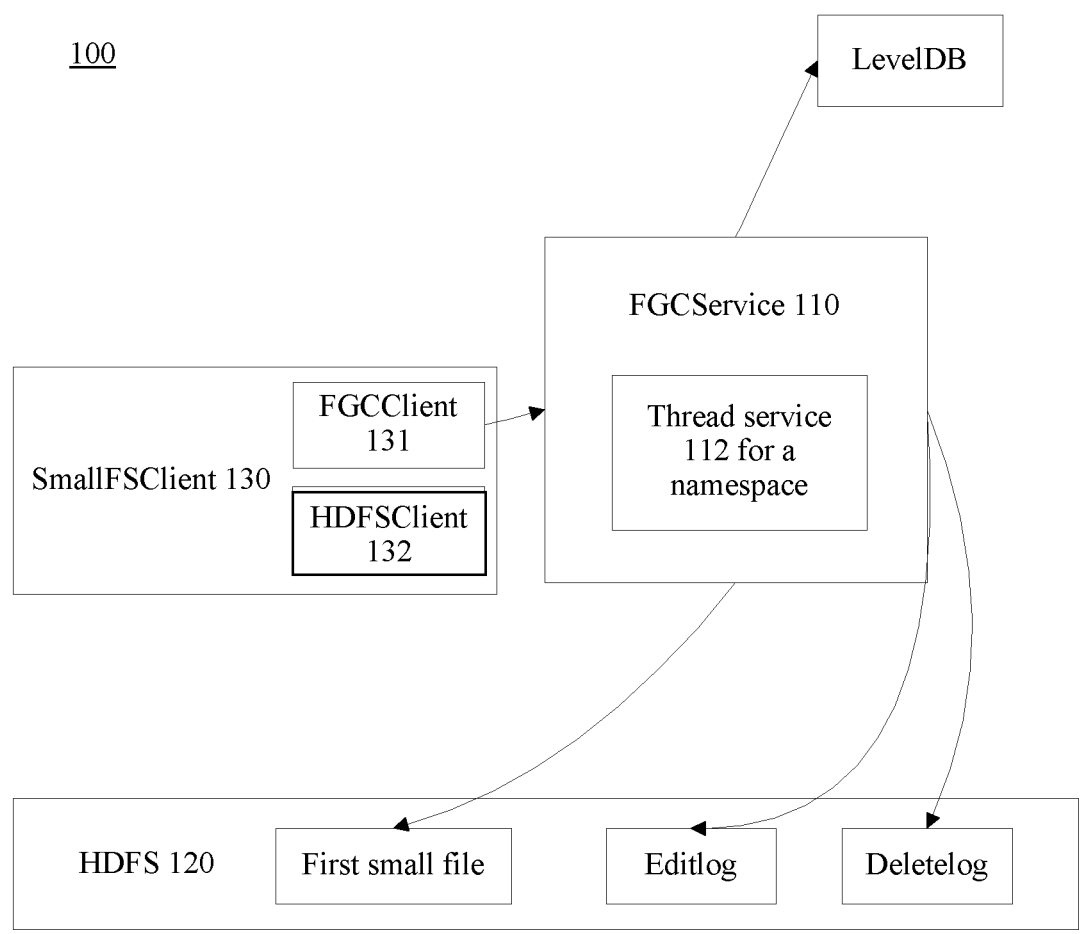
FIG. 9 is a schematic flowchart of deleting a first small file in a distributed storage method according to an aspect of the present disclosure.

Optionally, as shown in FIG. 9, FIG. 9 is a schematic flowchart of deleting a small file in a distributed storage method according to an aspect of the present disclosure. In the distributed storage system 100, when a user sends, by using the FGCClient 131, a request for deleting a first small file, the thread service 112 for a namespace may determine whether metadata of the first small file exists in the LevelDB.

Specifically, when the LevelDB does not include the metadata of the first small file, the thread service 112 deletes the first small file from the HDFS.

When the LevelDB includes the metadata of the first small file, and the user has permission to delete a merged large file corresponding to the first small file, the thread service 112 deletes the metadata of the first small file from the LevelDB, and loads Editlog and deletelog generated in the delete process into the HDFS 120.

It should be understood that the Editlog may be used to synchronize metadata of an active node and a standby node. The deletelog may include deletion information. The deletion information may be used by a background deletion service to delete the first small file from the large file.

Therefore, in this aspect of the present disclosure, a user can delete a small file and metadata of the small file from a LevelDB by using a thread service 112 for a namespace, so that efficiency of storing small files in an HDFS 120 can be improved.

Figure 10:
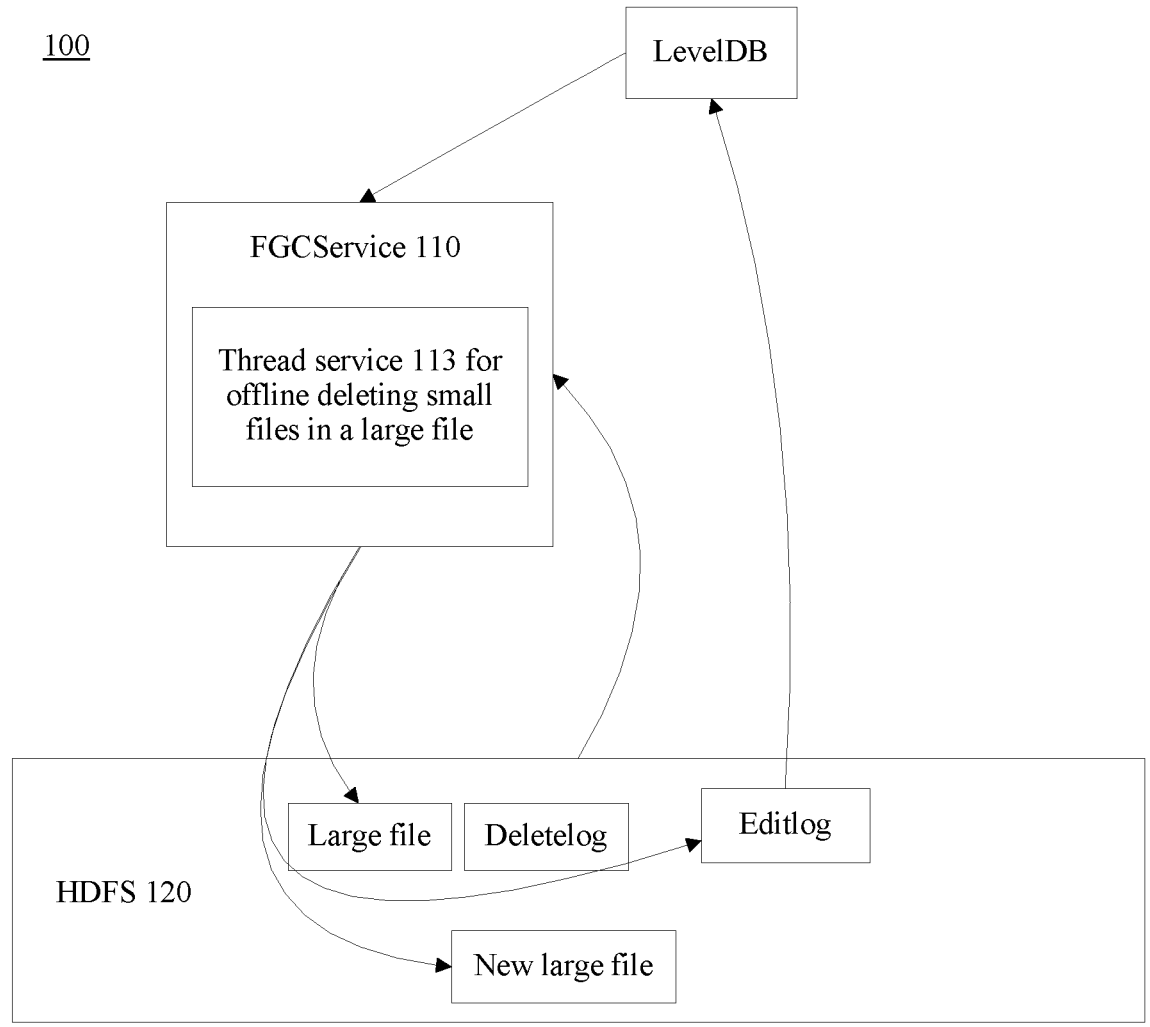
FIG. 10 is a schematic flowchart of deleting small files in a large file in a distributed storage method according to an aspect of the present disclosure.

Optionally, the distributed storage system 100 may include the thread service 113 for offline deleting small files in a large file. The thread service 113 for offline deleting small files in a large file may be started regularly. As shown in FIG. 10, FIG. 10 is a schematic flowchart of deleting small files in a large file in a distributed storage method according to an aspect of the present disclosure. When the FGCService 110 regularly starts the thread service 113 for offline deleting small files in a large file, the following operations may be included in the distributed storage system 100.

The thread service 113 for offline deleting small files in a large file reads a large file of deletelog and metadata of small files in a metadata set. The large file may include small files that need to be deleted and small files that need to be kept. If the deletelog instructs to delete N small files from the large file, the thread service 113 deletes the N small files. If the deletelog instructs to delete all small files from the large file, the thread service 113 deletes the large file.

The thread service 113 for offline deleting small files in a large file starts an MR task to obtain, from a large file, data of small files that need to be kept and regenerate a new large file, and starts a checkpoint operation to invoke the thread service 112 for a namespace to load Editlog generated in the delete process into the metadata set.

The thread service 113 for offline deleting small files in a large file deletes the large file and the deletelog.

Therefore, in the distributed storage method according to this aspect of the present disclosure, a user can delete small files from a large file by using a thread service 113 for offline deleting small files in a large file, so that efficiency of storing small files in an HDFS 120 can be improved.

Figure 11:
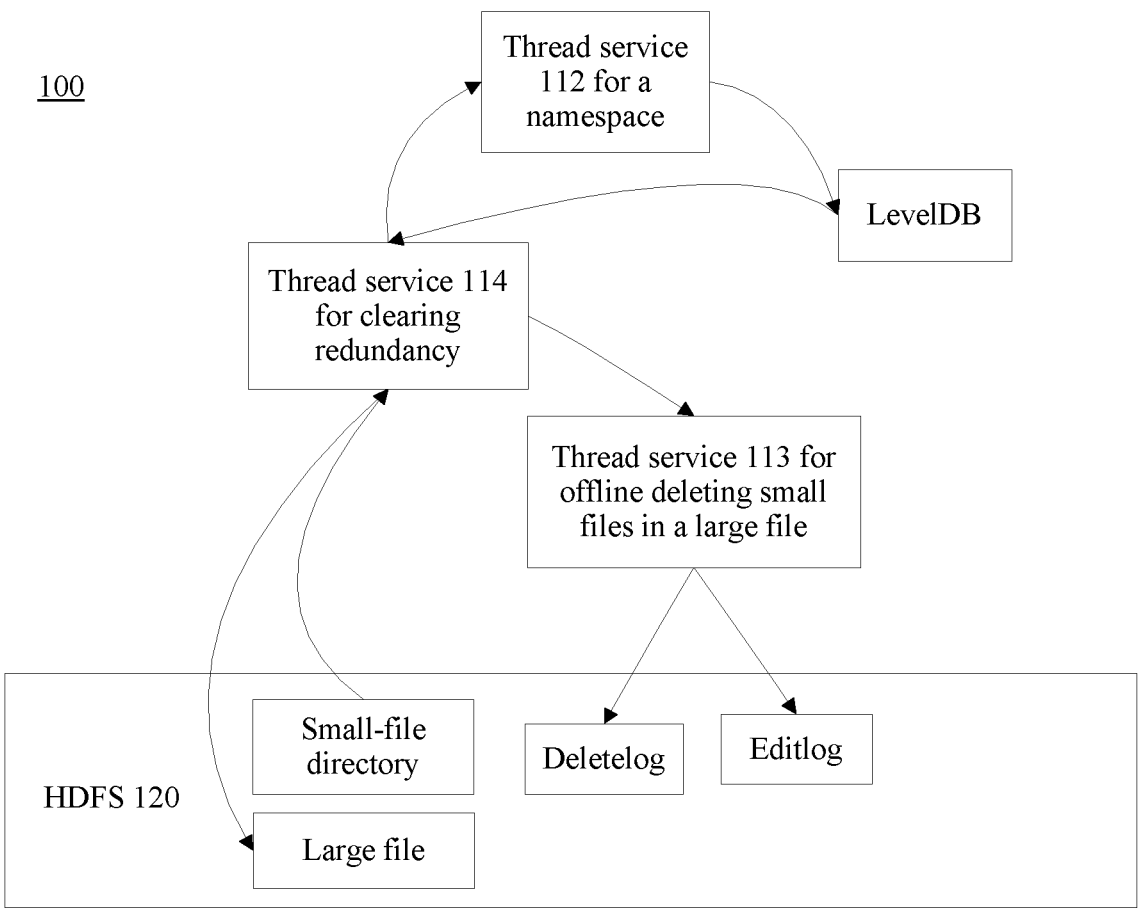
FIG. 11 is a schematic flowchart of clearing redundant data in a distributed storage method according to an aspect of the present disclosure.

Optionally, the distributed storage system 100 may include the thread service 114 for clearing redundancy. The thread service 114 for clearing redundancy may be started regularly. As shown in FIG. 11, FIG. 11 is a schematic flowchart of clearing redundancy in a distributed storage method according to an aspect of the present disclosure. When the FGCService 110 regularly starts the thread service 114 for clearing redundancy, the following operations may be included in the distributed storage system 100.

The thread service 114 for clearing redundancy traverses a small-file directory in the HDFS 120 and performs matching between the directory and metadata of small files in the LevelDB; when small files in the directory are not indexed to a large file in metadata of the small files, deletes the large file; and when a name of a small file in the directory and a name of a small file in metadata of the small file are repeated, invokes the thread service 112 for a namespace to delete the metadata of the small file from the LevelDB.

Optionally, after the metadata of the small file in the LevelDB is deleted, the thread service 114 for clearing redundancy invokes the thread service 113 for offline deleting small files in a large file to perform a thread service for offline deleting small files in a large file.

Specifically, the thread service 114 for clearing redundancy may invoke the thread service 113 for offline deleting small files in a large file to clear Editlog, deletelog, and other junk data.

Therefore, in this aspect of the present disclosure, a thread service 114 for clearing redundancy can clear redundant data in a system, so that efficiency of storing small files in an HDFS 120 can be improved.

In the foregoing specification, the distributed storage method according to the aspects of the present disclosure is described in detail with reference to FIG. 1 to FIG. 11. The following describes a distributed storage device according to an aspect of the present disclosure.

Figure 12:
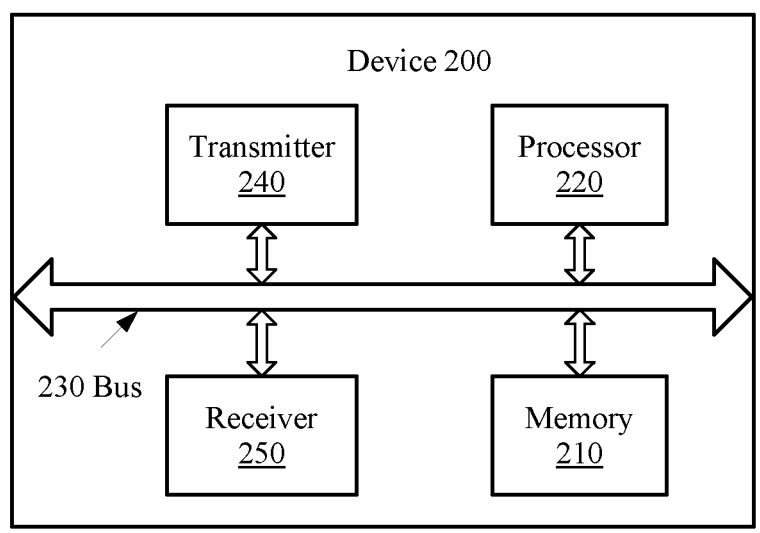
FIG. 12 is a schematic diagram of a distributed storage device according to an aspect of the present disclosure.

FIG. 12 is a schematic diagram of a distributed storage device according to an aspect of the present disclosure. A distributed storage device 200 includes a memory 210, a processor 220, and a bus 230. The memory 210 and the processor 220 are connected and communicate by using the bus 230. The memory 210 stores a program and an instruction. The processor 220 invokes the program and the instruction in the memory 210 to perform the method of FIG. 1.

It should be understood that the device 200 may further include a transmitter 240 and a receiver 250. The receiver 250 may be configured to receive an instruction, information, or the like. The transmitter 240 may be configured to send an instruction, information, or the like.

It should be understood that the device 200 in FIG. 12 may be configured to perform the method in the aspects of the present disclosure. The foregoing and other operations and/or functions of each part in the device 200 are used to respectively implement corresponding procedures of the method in FIG. 1. For brevity, details are not described herein.

According to the distributed storage method in the aspects of the present disclosure, when a distributed storage device 200 stores small files in a file system, memory overheads of a NameNode and handle overheads of a DataNode can be significantly reduced, and computing efficiency of MapReduce can be improved, so that efficiency of storing the small files can be improved.

A person of ordinary skill in the art may be aware that, in combination with the examples described in the aspects disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method aspects, and details are not described herein again.

In the several aspects provided in the present disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for small files optimization, comprising:
   merging, by a first thread service, M small files in a file system into one first file, wherein a size of each of the M small files is less than a predefined byte size, and wherein M is an integer that is greater than 1;
   generating, by the first thread service, M pieces of metadata, wherein each of the M pieces of metadata indicates a location of a corresponding one of the M small files in the first file;
   receiving, by a second thread service, a first instruction that instructs the second thread service to perform an operation on a first small file, wherein the first small file is one of the M small files, and wherein the first thread service and the second thread service are two different and separate thread services;
   obtaining, by the second thread service, metadata of the first small file from a metadata set that comprises metadata describing a plurality of small files including the M small files; and
   performing, by the second thread service, the operation on the first small file.

2. The method of claim 1, wherein the first instruction instructs the second thread service to read the first small file, and wherein the method further comprises returning, by the second thread service, a message indicating that the first small file does not exist when the metadata set does not include the metadata of the first small file.

3. The method of claim 1, wherein the first instruction instructs the second thread service to read the first small file, and wherein performing the operation on the first small file comprises reading, by the second thread service, the metadata of the first small file.

4. The method of claim 1, wherein the first instruction instructs the second thread service to create the first small file, and wherein the method further comprises creating, by the second thread service, the first small file in the file system when the metadata set does not include the metadata of the first small file.

5. The method of claim 1, wherein the first instruction instructs the second thread service to create the first small file, and wherein performing the operation on the first small file comprises:
   confirming, by the second thread service, whether to overwrite first small file content; and
   returning, by the second thread service, a creation failure message in response to being unable to confirm whether to overwrite the first small file content.

6. The method of claim 1, wherein the first instruction instructs the second thread service to create the first small file, and wherein performing the operation on the first small file comprises:
   confirming, by the second thread service, whether to overwrite first small file content;
   deleting, by the second thread service, the metadata of the first small file in the metadata set; and
   recreating, by the second thread service, the metadata of the first small file in the metadata set in response to confirming that the first small file content can be overwritten.

7. The method of claim 1, wherein the first instruction instructs the second thread service to delete the first small file, and wherein the method further comprises deleting, by the second thread service, the first small file from the file system when the metadata set does not include the metadata of the first small file.

8. The method of claim 1, wherein the first instruction instructs the second thread service to delete the first small file, and wherein performing the operation on the first small file comprises deleting, by the second thread service, the metadata of the first small file from the metadata set in response to being permitted to delete the first small file.

9. The method of claim 8, wherein after deleting the metadata of the first small file from the metadata set, the method further comprises loading, by the second thread service, editlog and deletelog into the file system, and wherein the deletelog comprises deletion information instructing to delete the first small file from the first file.

10. The method of claim 1, wherein the first thread service is for performing merging of a plurality of small files, and wherein the second thread service is for a namespace.

11. A server, comprising:
    a memory configured to store instructions; and
    one or more processors coupled to the memory and configured to execute the instructions to implement a first thread service and a second thread service and to cause the server to be configured to:
       merge, by the first thread service, M small files in a file system into one first file, wherein a size of each of the M small files is less than a predefined byte size, and wherein M is an integer that is greater than 1;
       generate, by the first thread service, M pieces of metadata, wherein each of the M pieces of metadata indicates a location of a corresponding one of the M small files in the first file;
       receive, by the second thread service, a first instruction that instructs the second thread service to perform an operation on a first small file, wherein the first small file is one of the M small files, and wherein the first thread service and the second thread service are two different and separate thread services;
       obtain, by the second thread service, metadata of the first small file from a metadata set that comprises metadata describing a plurality of small files including the M small files; and
       perform, by the second thread service, the operation on the first small file.

12. The server of claim 11, wherein the instructions further cause the server to be configured to return, by the second thread service, a message indicating that the first small file does not exist when the metadata set does not include the metadata of the first small file.

13. The server of claim 11, wherein the first instruction instructs the second thread service to read the first small file, and wherein the instructions further cause the server to be configured to read, by the second thread service, the metadata of the first small file.

14. The server of claim 11, wherein the first instruction instructs the second thread service to create the first small file, and wherein the instructions further cause the server to be configured to create, by the second thread service, the first small file in the file system when the metadata set does not include the metadata of the first small file.

15. A computer program product comprising instructions that are stored on a computer-readable medium and that, when executed by a processor, cause a server to:
    merge, by a first thread service of the server, M small files in a file system into one first file, wherein a size of each of the M small files is less than a predefined byte size, and wherein M is an integer that is greater than 1;

generate, by the first thread service, M pieces of metadata, wherein each of the M pieces of metadata indicates a location of a corresponding one of the M small files in the first file;

receive, by a second thread service of the server, a first instruction that instructs the second thread service to perform an operation on a first small file, wherein the first small file is one of the M small files, and wherein the first thread service and the second thread service are two different and separate thread services;

obtain, by the second thread service, metadata of the first small file from a metadata set that comprises metadata describing a plurality of small files including the M small files; and perform, by the second thread service, the operation on the first small file.

16. The computer program product of claim 15, wherein the first instruction instructs the second thread service to read the first small file, and wherein when executed by the processor, the instructions further cause the server to return, by the second thread service, a message indicating that the first small file does not exist when the metadata set does not include the metadata of the first small file.

17. The computer program product of claim 15, wherein the first instruction instructs the second thread service to read the first small file, and wherein when executed by the processor, the instructions further cause the server to read, by the second thread service, the metadata of the first small file.

18. The computer program product of claim 15, wherein the first instruction instructs the second thread service to create the first small file, and wherein when executed by the processor, the instructions further cause the server to be configured to create, by the second thread service, the first small file in the file system when the metadata set does not include the metadata of the first small file.

19. The computer program product of claim 15, wherein the first instruction instructs the second thread service to create the first small file, and wherein when executed by the processor, the instructions further cause the server to:
confirm, by the second thread service, whether to overwrite first small file content; and
return, by the second thread service, a creation failure message in response to being unable to confirm whether to overwrite the first small file content.

20. The computer program product of claim 15, wherein the first instruction instructs the second thread service to create the first small file, and wherein when executed by the processor, the instructions further cause the server to:
confirm, by the second thread service, whether to overwrite first small file content;
delete, by the second thread service, the metadata of the first small file in the metadata set; and
recreate, by the second thread service, the metadata of the first small file in the metadata set in response to confirming that the first small file content can be overwritten.

* * * * *